United States Patent
Chaudhuri et al.

(10) Patent No.: US 7,483,918 B2
(45) Date of Patent: Jan. 27, 2009

(54) DYNAMIC PHYSICAL DATABASE DESIGN

(75) Inventors: Surajit Chaudhuri, Redmond, WA (US); Arnd Christian Konig, Redmond, WA (US); Vivek R. Narasayya, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 383 days.

(21) Appl. No.: 10/914,901

(22) Filed: Aug. 10, 2004

(65) Prior Publication Data

US 2006/0036989 A1   Feb. 16, 2006

(51) Int. Cl.
G06F 7/00 (2006.01)
(52) U.S. Cl. ............................ 707/104.1; 707/3
(58) Field of Classification Search .............. 707/104.1, 707/3, 100; 717/108
See application file for complete search history.

(56) References Cited

U.S. PATENT DOCUMENTS

| | | | |
|---|---|---|---|
| 5,913,206 | A | 6/1999 | Chaudhuri et al. |
| 5,913,207 | A | 6/1999 | Chaudhuri et al. |
| 5,924,090 | A | 7/1999 | Krellenstein |
| 5,926,813 | A | 7/1999 | Chaudhuri et al. |
| 5,940,821 | A | 8/1999 | Wical |
| 5,950,186 | A | 9/1999 | Chaudhuri et al. |
| 5,960,423 | A | 9/1999 | Chaudhuri et al. |
| 6,169,983 | B1 | 1/2001 | Chaudhuri et al. |
| 6,182,066 | B1 | 1/2001 | Marques |
| 6,223,171 | B1 | 4/2001 | Chaudhuri et al. |
| 6,266,658 | B1 | 7/2001 | Adya et al. |
| 6,356,890 | B1 | 3/2002 | Agrawal et al. |
| 6,356,891 | B1 | 3/2002 | Agrawal et al. |
| 6,363,371 | B1 | 3/2002 | Chaudhuri et al. |
| 6,366,903 | B1 | 4/2002 | Agrawal et al. |
| 6,374,241 | B1 | 4/2002 | Lamburt et al. |
| 6,460,045 | B1 | 10/2002 | Aboulnaga et al. |
| 6,513,029 | B1 | 1/2003 | Agrawal et al. |
| 6,529,901 | B1 | 3/2003 | Chaudhuri et al. |
| 2002/0087550 | A1 | 7/2002 | Carlyle et al. |
| 2002/0099700 | A1 | 7/2002 | Li |
| 2002/0103787 | A1 | 8/2002 | Goel et al. |
| 2003/0022200 | A1* | 1/2003 | Vissing et al. ................. 435/6 |
| 2003/0154204 | A1 | 8/2003 | Chen-Wright et al. |
| 2003/0182276 | A1* | 9/2003 | Bossman et al. ............... 707/3 |
| 2004/0003005 | A1 | 1/2004 | Chaudhuri et al. |
| 2004/0019593 | A1 | 1/2004 | Borthwick et al. |
| 2004/0139061 | A1 | 7/2004 | Colossi et al. |
| 2005/0027717 | A1 | 2/2005 | Koudas et al. |
| 2005/0086263 | A1* | 4/2005 | Ngai et al. ............... 707/104.1 |

(Continued)

OTHER PUBLICATIONS

Qiao, Lin, et al., "RHist: Adaptive Summarization over Continuous Data Streams," Proceedings of the Eleventh Int'l. Conference on Information and Knowledge Management, 2002, pp. 469-478.

(Continued)

Primary Examiner—Charles Rones
Assistant Examiner—Fariborz Khoshnoodi
(74) Attorney, Agent, or Firm—Lee & Haynes, PLLC (57) ABSTRACT

A monitoring component of a database server collects a subset of a query workload along with related statistics. A remote index tuning component uses the workload subset and related statistics to determine a physical design that minimizes the cost of executing queries in the workload subset while ensuring that queries omitted from the subset do not degrade in performance.

18 Claims, 6 Drawing Sheets

U.S. PATENT DOCUMENTS

| | | |
|---|---|---|
| 2005/0125401 A1 | 6/2005 | Carr et al. |
| 2005/0149907 A1* | 7/2005 | Seitz et al. ............... 717/108 |
| 2005/0192978 A1* | 9/2005 | Lightstone et al. ......... 707/100 |

OTHER PUBLICATIONS

Mathkour, Hassan, "An Intelligent Tool for Boosting Database Performance," Journal of King Saud Univeristy (Computer and Information Sciences), vol. 10, 1998, pp. 81-106.

Ananthakrishna, et al., "Eliminating Fuzzy Duplicates in Data Waehouses," Proceedings of the 28th VLDB Conference on Very Large Databases, 2002, pp. 12.

Aref, et al., "Hashing by Proximity to Process Duplicates in Spatial Databases", Proceedings of Conference on Information and Knowledge Managements, Nov. 28-Dec. 2, 1994, pp. 347-354.

Berndt, et al., "Customer and Household Matching: Resolving Entity Identity in Data Warehouses", Proceedings of the SPIE, vol. 4057, 2000, pp. 173-180.

Bitton, et al., "Duplicate Record Elimination in Large Dta Files", ACM Transactions on Database Systems, vol. 8, No. 2, Jun. 1983, pp. 255-265.

Chaudhuri, et al., "Robust and Efficient Fuzzy Match for Online Data Cleaning," Proceedings of the ACM SIGMOD, Jun. 2003, pp. 313-324.

Cohen, "Integration of Heterogeneous Databases Without Common Domains Using Queries Based on Textual Similarity," Proceedings of ACM SIGMOD, Jun. 1998, Seattle, WA, pp. 201-212.

Cohen, et al., "Learning to Match and Cluster Large High-Dimensional Data Sets for Data Integration", Proceedings of the ACM SIGKDD International Conference on Knowledge Discovery and Data Mining, 2002, pp. 475-480.

Elfeky et al., "Institute of Electrical and Electronics Engineers: Tailor: a record linkage toolbox", Proceedings ot the 18th International Conference on Data Engineering. (ICDE '2002). San Jose, CA. Feb. 26-Mar. 1, 2002. pp. 17-28.

Ester, et al., "A density-based algorithm for discovering clusters in large spatial databased with noise", Second International Conference on Knowledge Discovery and Data Mining AAAI Press Menlo Park, CA, US, 1996 pp. 226-331.

Gu et al., "Record Linkage: Current Practice and Future Directions", CSIRO Mathematical and Information Sciences-Technical Report, 03/83, Apr. 2003, pp. 1-32.

Hernandez, et al., "Real-world Data is Dirty: Data Cleansing and The Merge/Pruge Problem", Data Mining and Knowledge Discovery, vol. 2, No. 1, 1998, pp. 9-37.

Hernandez, et al., "The Merge/Purge Problem for Large Databases," Proceedings of the ACM SIGMOD, May 1995, San Jose, CA, pp. 127-138.

Khizder, et al., "Reasoning about Duplicate Elimination with Description Logic", Computational Logic-CL 2000, vol. 1861, Jul. 24-28, 2000, pp. 1017-1032.

Low, et al., "A Knowledge-based Approach for Duplicate Elimination in Data Cleaning", Information Systems, vol. 26, No. 8, Dec. 2001, pp. 585-606.

Monge, et al., "An efficient domain-independent algorithm for detecting approximately duplicate database records," Proceedings of the ACM SIGMOD Workshop—Data Mining and Knowledge Discovery, May 1997, pp. 23-29.

Monge, et al., "The Field Matching Problem: Algorithms and Applications," Proceedings / Second Int'l. Conference on Knowledge Discovery & Data Mining, 1996, pp. 267-270.

Saake, et al., "Sorting, Grouping, and Duplicate Elimination in the Advanced Information Management Prototype", Proceedings of the Fifteenth International Conference on Very Large Data Bases, 1989, pp. 307-316.

Schwartz, "Databases and Merge/Purge: Select the Proper Service", Computers in Biology and Medicine, vol. 48, No. 3, Jul. 1985, pp. 56, 58.

Slivinskas, et al., "A Foundation for Conventional and Temporal Query Optimization Addressing Duplicates and ordering", IEEE Transactions on Knowledge and Data Engineering, vol. 13, No. 1, Jan.-Feb. 2001, pp. 21-49.

Wajda, et al., "Simplifying Record Linkage: Sorftware and Strategy", Computers in Biology and Medicine, vol. 17., No. 4, 1987, pp. 239-248.

* cited by examiner

Fig. 1

| ATTRIBUTE NAME | TYPE | COMMENT |
|---|---|---|
| Query ID | Integer | |
| Query Text | String | |
| Log. Plan Signature | Integer | |
| Phys. Plan Signature | Integer | |
| Log. Transaction Signature | Integer | Refer to the context the query is called in |
| Log. Transaction Signature | Integer | |
| Start_Time | | |
| Duration | Float | |
| Estimated_Cost | Float | |
| Table_accessed_write | | |
| Index_accessed_read | | |
| Time_Blocked | Float | |
| Times_Blocked | Integer | |
| Queries_Blocked | Integer | # of queries currently blocked |
| SPID | Integer | |
| Number_of_instances | Integer | |
| Query Type | atomic | Type ∈ {UPDATE, SELECT, INSERT, DELETE} |

*Fig. 2*

| Name | Probe/Expression | Column Type |
|---|---|---|
| Signature1 | Logical_Signature | Grouping |
| Signature2 | Physical_Signature | Grouping |
| Query_Text | FIRST(10,Query_Text) | Aggregation |
| Total_Cost | SUM(Duration) | Aggregation |
| First_Access | FIRST(StartTime) | Aggregation |
| Last_Access | LAST(StartTime) | Aggregation |
| Tables_Accessed | UNION(Table_accessed_write) | Aggregation |
| Indexes_Accessed | UNION(Index_accessed_read) | Aggregation |
| Avg_Cost | Total_Cost/(Last_Access-First_access) | Ordering |

Fig. 3

| Name | Probe/Expression | Column Type |
|---|---|---|
| DBId | DatabaseId | Grouping |
| TableID | TableID | Grouping |
| IndexID | IndexID | Grouping |
| Total_Cost | SUM(Duration) | Aggregation |

Fig. 4

| Name | Probe/Expression | Column Type |
|---|---|---|
| DBId | DatabaseId | Grouping |
| TableID | TableID | Grouping |
| Total_Cost | SUM(Duration) | Aggregation |

DYNAMIC PHYSICAL DATABASE DESIGN

TECHNICAL FIELD

The present disclosure generally relates to database administration, and more particularly to dynamically collecting query workload and related statistics on a database server and determining a physical design of the database based on the workload and the statistics.

RELATED APPLICATIONS

This patent application is related to co-pending and commonly assigned application: "Database Monitoring System", application Ser. No. 10/788,077, which is hereby incorporated by reference.

BACKGROUND

Computer database systems manage the storage and retrieval of data in a database. Databases include a set of tables of data along with information about relations between the tables. Tables represent relations over the data. Each table includes a set of data records stored in one or more data fields. The data records of a table are often referred to as rows, and the data fields across the data records in a table are referred to as columns.

A database server processes data manipulation statements or queries, for example, to retrieve, insert, delete, and update data in a database. Queries are defined by a query language supported by the database system. Users can write queries and run them against a database, for example, to retrieve desired information from the database. In general, to retrieve requested information, a database server can retrieve an appropriate table from storage, load it into memory, and search row by row for the desired information. However, as databases have grown very large in size, searching for data in this manner can be very time consuming and inefficient.

In order to make this type of search more efficient, indexes can be built on the database. An index is a subset of a table that typically contains fewer columns than the table itself. Indexes are sometimes created prior to a user query being made. Some indexes are arranged in a tree like structure which makes finding information even faster. If an index exists that contains the data that the user desires, it is much easier for the database server to just search the index to provide the information than it is to search through the entire table.

Another way to improve the performance of a query is to use a materialized view, also referred to as an indexed view. A materialized view represents a particular view of the data (e.g., the results of a query) that has been materialized, and it may be used to answer different queries. A materialized view has some characteristics that a traditional index does not have. Materialized views can be defined over multiple tables and can have selections and groupings made over multiple columns. As with traditional indexes, materialized views incur an overhead each time the tables referenced in the materialized view are updated. The use of indexes and materialized views can provide a dramatic performance improvement when retrieving, inserting, deleting, and updating data in a database.

The configuration or physical design of a database includes a set of indexes, materialized views, and indexes on materialized views used in the execution of a workload against the database. A workload is a set of queries and updates that are run against a given database. Given a workload of multiple queries, determining which indexes and materialized views to include in a physical design is very complicated and time consuming. Since there is overhead associated with generating, maintaining and storing the indexes and materialized views, this must be offset against the benefit obtained by using them.

Current commercial database systems typically offer two separate tools to assist database administrators with the task of choosing the physical design of a database. There are tools sometimes referred to as tuning components that, when given a query workload (i.e. a set of database queries and the individual queries' frequencies), suggest a physical design that optimizes the performance of the workload. In cases where the workload executing against the system is not known to the administrator, there exist additional database monitoring tools that observe the queries executed against the database system and log the corresponding query statements. Despite the existence of these tools, automating the tuning loop for database physical design has yet to be achieved.

A significant problem in automating the tuning loop for database physical design involves the collection of the query workload that is currently executing on the system. Conventional database servers monitor query workload and other database activity through two types of tools; an event polling tool, and an event logging tool. A polling tool pushes out a snapshot of all activities occurring in the database at a given moment, and then it aborts. Drawbacks with this tool are that polling the server too infrequently will cause the monitoring application to miss valuable information, while polling more frequently can impose significant CPU overhead on the server. Event logging tools allow an administrator to specify events for which the database can publish notifications and additional related information. Although logging tools capture all the specified events, significant overhead can be incurred by the database server. Commercial servers often execute a thousand or more queries per minute, so potentially large numbers of events may need to be written out of the server to a file or table, or sent over a network.

Thus, capturing query statement text and events associated with a query (e.g., query statement begin and end, lock acquire and release, user login and logout, etc.) can introduce significant performance degradation, since logging this information to stable storage requires significant overhead. In addition, existing tuning tools are designed for relatively small workloads and they do not scale up to workloads containing millions of queries collected by monitoring busy database servers over longer periods, even when techniques such as workload compression are employed.

Both of these scalability-issues can be addressed by using only a subset of the workload (which may be selected, for example, by sampling). However, the physical design resulting from tuning a subset of the workload may lead to significant degradation of the queries that have been omitted from the collected subset.

Accordingly, a need exists for a way to collect a subset of a query workload and tune a database physical design using the subset while not degrading the performance of those queries not included in the workload subset.

SUMMARY

A monitoring component of a database server collects a subset of a query workload along with related statistics. A remote index tuning component uses the workload subset and related statistics to determine a physical design that minimizes the cost of executing queries in the workload subset while ensuring that queries omitted from the subset do not degrade in performance.

The monitoring component captures a workload subset and related statistics from a query workload executing against a database of a database server. The workload subset is compressed online and its size is limited based on a memory constraint placed on the subset when it is stored in the server memory. The workload subset and statistics are captured over a moving time interval of set duration and transferred to an index tuning component on a device that is remote to the database server. Based on the workload subset and the statistics, the index tuning component determines a physical design and a minimized estimated cost of executing the workload subset subject to a constraint that no query be allowed to degrade in performance if that query is within the query workload but not within the workload subset. The physical design recommendations and estimated cost are reported to a database administrator. The database administrator can determine if the estimated cost is an improvement sufficient for implementing the physical design on the database.

BRIEF DESCRIPTION OF THE DRAWINGS

The same reference numerals are used throughout the drawings to reference like components and features.

DETAILED DESCRIPTION

Introduction

The following discussion is directed to a system and methods that provide a dynamic physical design tuner for a database. In general, an in-server monitoring engine collects and compresses a representative workload (and related statistics) executing against the database online (i.e., while the database server is running). The representative workload and related statistics are copied to a database tuning component at regular intervals. The database tuning component is typically located on a different physical machine than the database server so that the overhead of the tuning does not interfere with the server's performance. The remote database tuning component then analyzes the representative workload (and statistics) and reports a new physical design and optimizer-estimated cost of executing the representative workload to a database administrator. Based on the estimated cost, the administrator can decide if the resulting improvement is sufficient to warrant implementing the new physical design on the production database.

The representative workload captured is one that is observed over an administrator-specified duration (interval length) that ranges from a current point in time, now, back to a preceding point in time. Although a representative workload might be considered to include all queries executed against the database (i.e., assuming no resource constraints existed for workload collection and tuning), as time passes by, analysis/tuning of such a representative workload would result in a physical design that is increasingly less responsive to changes in the load characteristics. On the other hand, collecting queries only over a small window in time may lead to a large number of rare queries (such as batch jobs only run during periods of low database activity, or reporting tasks) not being captured, which may result in subsequent degradation of their performance due to adverse physical design. Database administrators typically know how much monitoring time is required for all important business tasks in the database to occur at least once. Furthermore, if the administrator is unsure of the relevant time to choose, picking a larger time window is a safe alternative in that it may lead to a slower adaptation to load changes, but would avoid degradation due to ignored queries. Thus, representative workload captured is one observed over an interval of time as discussed above.

Because the monitoring engine is part of the database server, it can access a number of attributes of each query (such as a query's execution plan or estimated cost) that are required for effective compression, while incurring only a very small overhead cost. The collected workload is stored in memory on the database server, with the amount of memory being set by the database administrator. The memory constraint provides the administrator with some control over the impact the workload collection has on the overall system.

Because the representative workload collected is limited in amount by the main memory constraint, it is possible that only a subset of the overall workload is collected as the representative workload. Determining a physical design based on such a subset of the overall workload can lead to degraded performance for the queries that are not collected as part of the subset. To address this, additional statistics are collected online that indicate what queries access which physical database objects (e.g., which indexes and materialized views). The database tuning component uses the statistics and the workload subset to determine a new physical design. Use of the statistics with the workload subset ensures that the performance of the queries omitted from the subset is not degraded.

Dynamic Physical Design System

Figure 1:
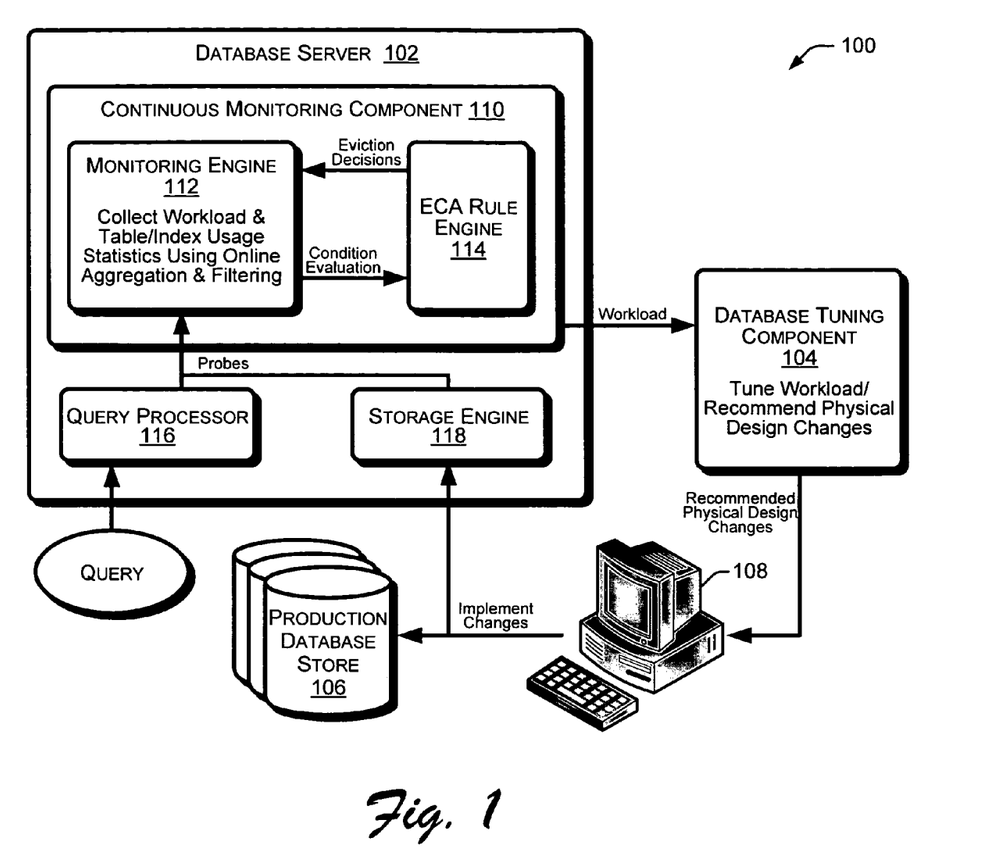
FIG. 1 illustrates an exemplary architecture for a dynamic physical design system.
Figure 8:
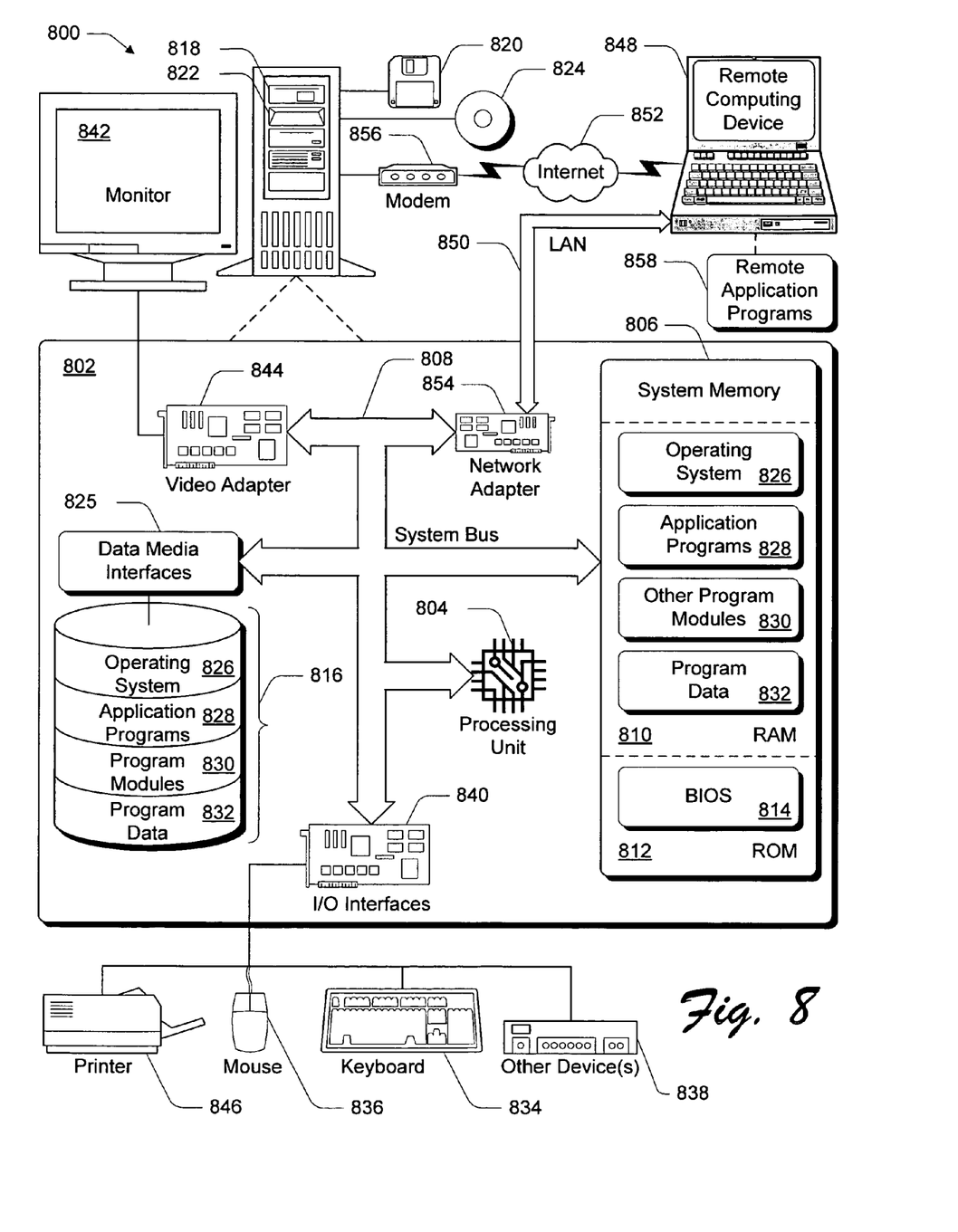
FIG. 8 illustrates an exemplary computing environment suitable for implementing computers such as those discussed with reference to FIGS. 1 and 2.

FIG. 1 illustrates an exemplary architecture for a dynamic physical design system 100. The dynamic physical design system 100 includes a database server 102, a database tuning component 104, a production database store 106, and a database administer (DBA) 108. The database tuning component 104 is typically located on a different physical computing device other than the database server 102. The production database store 106 may or may not be located on the database server 102. The database server 102, database tuning component 104, and production database store 106 are most typically constructed in software executing on a computer system 800 (FIG. 8) such as a server computer, which in turn is coupled to other servers or computers on a network. Such a computer system 800 is depicted in FIG. 8 and described in greater detail below in the Exemplary Computing Environment section.

Database server 102 includes a continuous monitoring component 110 that monitors query workload with monitoring engine 112 and enables a user to specify a variety of monitoring tasks through ECA rule engine 114, including the ability to take actions based on monitored data. The evaluation of database events takes place online, or within the execution code path of the database events running on the database server 102. The continuous monitoring component 110 enables a 'real time' evaluation of database events and provides the ability to filter and aggregate monitored data within the server 102. Therefore, the volume of information that needs to be exposed from the server 102 to the database tuning component 104 for subsequent index tuning is typically small. Thus, the overhead for passing monitored data out of the server 102 can be kept small. As discussed in the background, current database monitoring systems either require pushing out all the data (incurring high overhead) or pulling the required data by polling the server (incurring high overhead or sacrificing accuracy).

Figure 2:
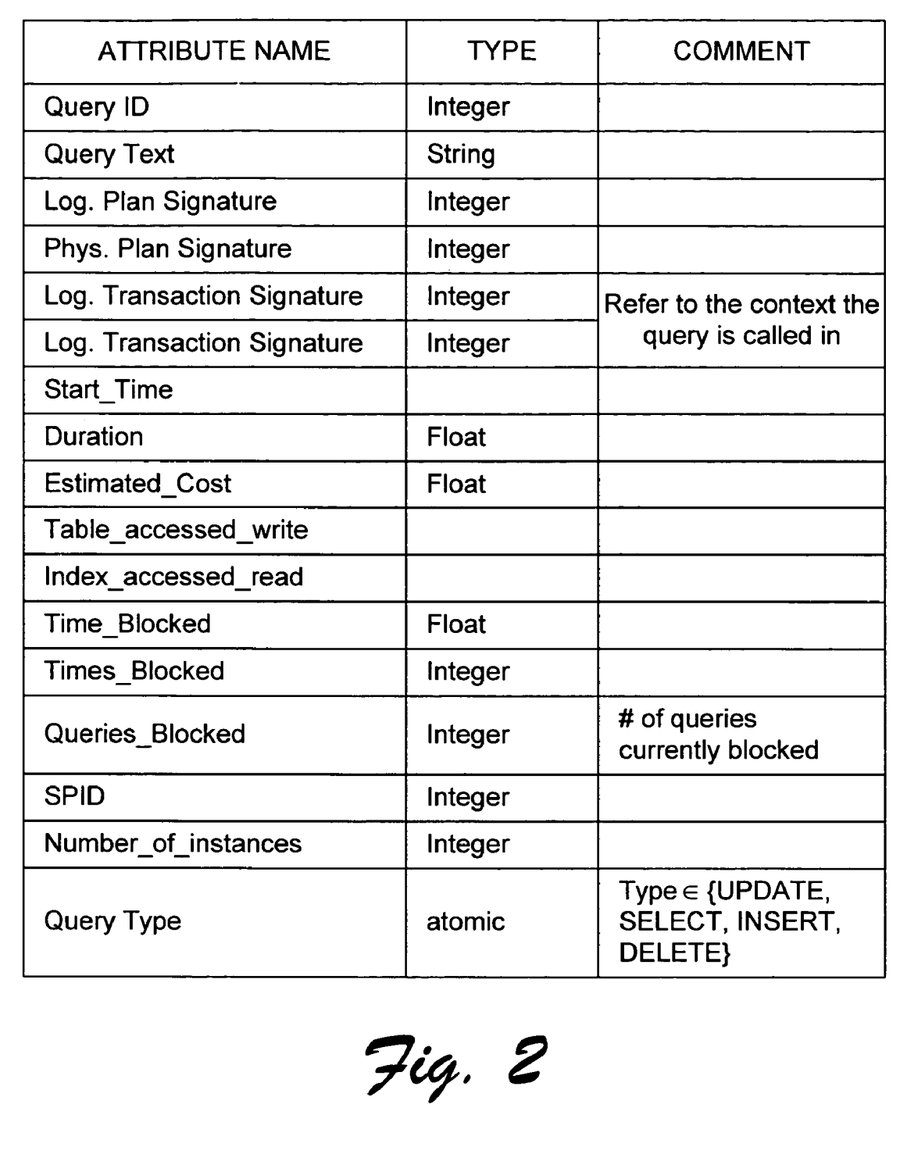
FIG. 2 illustrates an exemplary portion of a schema dealing with a query object type.

A user (typically a DBA 108) interacts with continuous monitoring component 110 by specifying ECA rules (through ECA rule engine 114) for implementing monitoring tasks. These rules are expressed against a schema that defines valid events, conditions, and actions supported by the continuous monitoring component 110. The basis of the schema is a set of monitored object types and their attributes, which are abstractions for entities in the database system that can be monitored. An example of the portion of the schema dealing with the query object type is shown in FIG. 2. The query type is an abstraction for a query that is executed by the server 102. The Query type has a fixed set of attributes such as Duration (actual time taken to execute the query), Estimated_Cost (time estimated by the optimizer to execute the query), Table_accessed_write (a set type storing all tables that the query writes to, including both update and delete statements), and Index_accessed_read (a set type storing all indexes, or indexed views, that the query reads from). The other attributes for the Query object are listed in the table in FIG. 2. Attributes are referred to in this context as probes (see FIG. 1) since their values are populated by probing (or extracting from) the database server 102. Support of an attribute or probe in the schema can require instrumentation of server code to be able to extract necessary information (e.g. inserting a timer around query execution code to measure Duration, or extracting the estimated execution time from the execution plan generated by the query optimizer). In general, the decision of exactly what object types and attributes should be exposed in the schema will be determined by the expected usage.

The Query type object is one of seven server objects that are monitored in a simple version of the continuous monitoring component 110. A Transaction object has identical attributes to the query object, except for the plan signatures, which are exposed as a single value, and transaction signatures, which are exposed as a list of the corresponding (logical) plan signatures. Blocker and Blocked objects represent combinations of queries where the Blocker query owns a lock on a resource incompatible with the lock and the Blocked query is waiting on the same resource. A Timer object is provided to facilitate periodic invocation of rules that cannot be tied to a specific event. The system exposes a set number of Timer objects. These timers can be set to a specific wait period, after which they create a Timer.Alarm event. A Timer object is also provided that exposes the current time as an attribute. A Table object and Index object are also provided (with the Index class encompassing all physical structures in the database, i.e. indexes, index views and heaps). Tables are uniquely identified by their database and table ids. In the case of Indexes, an index id is added. All of the ids are exposed as probes (see FIG. 1). Both the Table object and Index object have a Read and Write event, which is triggered when a query reads from or writes to them. In these cases, both objects expose an additional probe, Duration, containing the cost of the query triggering the event. It will be appreciated that these server object types are but a small subset of the server object types that would be useful in implementing a database monitoring system in accordance with the present invention.

A user/DBA 108 also interacts with the database tuning component 104 typically located on a computing device that is remote from the database server 102. The database tuning component 104, discussed in greater detail below, generally receives monitored data from database server 102 and, based on the monitored data, recommends a physical design and workload cost estimate to the DBA 108. The DBA 108 can instruct the tuning component 104 when to perform this tuning function, for example, at certain time intervals.

Monitoring Engine

The continuous monitoring component 110 of FIG. 1 includes a monitoring engine 112 that is implemented in close association with the database server 102, resulting in numerous advantages over polling and logging techniques discussed in the background section. The monitoring engine 112 collects objects and attributes necessary to implement currently active ECA rules. Objects are grouped, and aggregates are computed for each group, and the resulting data is stored in in-memory data structures called lightweight aggregation tables (LATs). Grouping in LATs is performed on attributes of the object type. For example, in one LAT, queries can be grouped by the application (or user) that issued them. In addition, for certain object types, the monitoring system provides a library of special attributes called signatures, which can also be helpful for grouping objects of that type. Intuitively, a signature is an encoding of the object, such as a hash value, that is computed by the monitoring engine 112. For example, one kind of signature for a Query type object is such that all queries that are identical except in their parameter values (i.e., constants) are assigned the same signature value. Such a signature can be useful for grouping all instances of the same query template for performance comparisons. For many tasks such as reporting the average and standard deviation of the Duration attribute of all queries in a signature group, only an aggregate value of one or more attributes in a group is necessary. Aggregation functions such as COUNT and AVERAGE can be specified on any attribute in this manner.

The various attributes of the exposed objects are gathered through probes inside the relevant execution paths. The monitoring engine 112 collects the attributes of the monitored objects through use of probes inside the query processor 116 and storage engine 118, which are assembled into objects on demand at the time of rule evaluation. As most of the probes are available at various points of the server code already, this typically adds negligible overhead to query execution.

In most cases the use of probes adds negligible overhead to the execution time, as most of the exposed statistics are recorded inside the database server 102 already. The only exception to this is the computation of pairs of a blocking and blocked query. This requires traversal on the lock-resource graph; if the rule that references these objects is triggered by a related event (such as Query.Blocked), the code triggering rule evaluation is simply piggybacked on a regular lock-conflict detection code.

Figure 3:
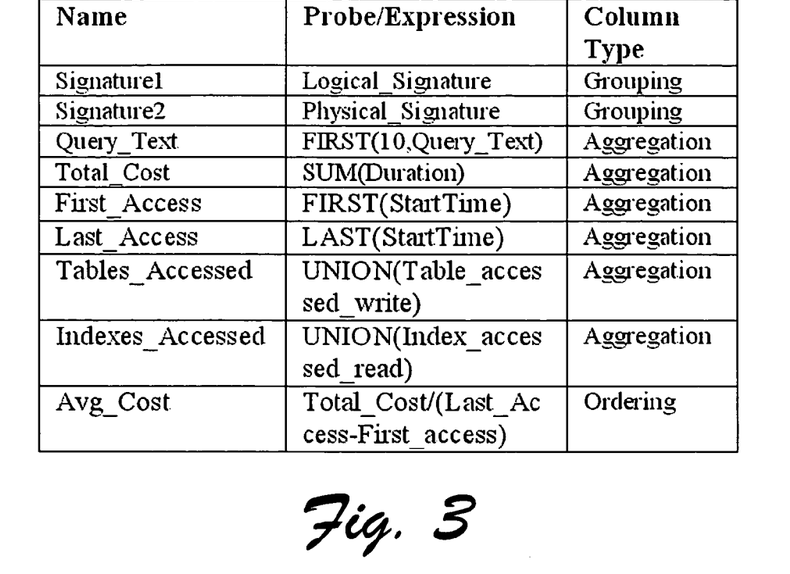
FIG. 3 illustrates a Workload LAT (Lightweight Aggregation Table) for storing a workload subset.

As mentioned above, a representative workload is one that is observed and captured over an administrator-specified time interval that ranges from a current point in time, now, back to a preceding point in time. Thus the specified time interval provides a sliding window in time over which a workload is observed. Given a workload, WL, and a memory-constraint m, monitoring engine 112 observes WL over this sliding time interval (i.e., [now -$\Delta$, now]) as it executes on database server 102, and captures a subset WL' of WL (and additional statistics) that can at any point in time be kept in m bytes of memory. Monitoring engine 112 further maximizes the cost of the queries captured in subset WL'. Maximizing the cost of queries involves keeping queries in WL' that have higher frequencies of table accesses and higher average execution costs while evicting other queries from WL', which is discussed further below with respect to the Workload LAT (Table 1). In general, those queries having higher frequency and average execution costs are the most critical queries to be tuned well in the database tuning component 104.

It is possible to achieve significant compression of the workload for tuning purposes by using query signatures to group queries that follow the same query template, and keeping only a small number of query strings for each template. In scenarios where the memory constraint does not allow keeping all queries in memory on the database server 102, it is often possible to achieve significant compression of the workload by exploiting the fact that database workloads are typically made up of a limited set of query templates. While database workloads may consist of large numbers of queries, few of these are usually generated by hand. Rather, most of the queries are submitted through applications or in the form of stored procedures. Therefore, most of the queries are typically generated from "query templates" with only a small number of varying parameters. The continuous monitoring component 110 can identify these query templates by observing the logical query plan submitted to the optimizer (not shown) and the physical execution plan used to execute a query. The monitoring component 110 can then group queries belonging to the same template. These templates are designed to group queries benefiting from the same set of physical design structures. Thus, instead of keeping all query strings of a workload template, submitting only a small subset of them (and scaling their weight up in the workload submitted to the database tuning component 104 accordingly) results in very similar physical design recommendations.

Because the continuous monitoring component 110 is part of the database server 102 itself, the statistics required for the template-based grouping can be accessed at very little overhead.

It is important to note that grouping queries based on query templates may result in inaccurate estimates of the improvement/degradation of the queries from WL making up the template. However, using the largest cost among the queries kept for purposes of estimating the performance under new index configurations, typically results in an upper bound of the estimated cost (and thus a lower bound of the estimated improvement) of all the queries in WL, maintaining the lower bound properties. For query templates for which (during the tuning itself) the signature-based grouping results in the grouped queries not behaving similarly under the physical designs under consideration, the grouping can be disabled for these signatures in further monitoring loops.

Rule Engine

A rule engine 114 uses a lightweight Event-Condition-Action (ECA) framework as the interface for specifying monitoring rules. Since the rule engine 114 is implemented in the server and rules are evaluated in the execution code path of events, efficiency is a concern. Due to their simplicity, ECA rules are amenable to implementation with low CPU and memory overheads. ECA rules also allow specification of options that control the memory overhead of monitoring. Moreover, the CPU overhead of monitoring events is limited to whatever is necessary to evaluate the currently specified rules.

The rule engine 114 monitors events and takes the necessary action when the condition in a rule becomes true, known as the rule "firing". The evaluation of rules is written into the execution code path for database events that are selected to be enabled for monitoring. When execution of a database event occurs, the status of rules in the rule engine is checked to determine if a rule is active that is triggered by the event.

For example, the following rule appends to a specified table T, any query (when it commits) that takes more than 100 seconds to execute:

Event: Query.Commit
Condition: Query.Duration>100
Action: Query.Report(T)

Actions such as writing an entry to a table, sending an email, or launching a specified program in response to an event can be useful for a variety of monitoring tasks.

In order to provide efficient rule evaluation during the execution code path of database events, the dynamic physical design system 100 includes three features: LATs, query signatures, and a lightweight ECA rule engine 114.

Lightweight Aggregation Tables (LATs)

The continuous monitoring component 110 performs some monitoring tasks that require the ability to filter on dynamically maintained aggregate values of probes (as opposed to constant thresholds, which are typically supported in currently available client-side monitoring applications). Thus, it is advantageous to keep some state of the collected probes, which can be referenced inside the conditions of ECA rules. This ability is important for any monitoring application that seeks to detect outliers, changes in workload, or any other condition that correlate the present and past performance.

The ability to keep state or history information about probes is provided through LATs (Lightweight Aggregation Tables), which offer a mechanism for storing aggregate information over collections of monitored objects. A LAT is defined through (a) a set of grouping attributes and (b) a set of aggregation functions, both of them defined over the attributes of the monitored object stored in the LAT.

The continuous monitoring component 110 keeps state in three LATs. LATs provide a mechanism for storing aggregate information over collections of monitored objects and are defined through a set of grouping attributes and a set of aggregation functions, both sets being defined over the attributes of the monitored object stored in the LAT. A Workload LAT (FIG. 3) is responsible for storing the subset of the workload that is collected. An Index_Usage LAT (FIG. 4) is responsible for maintaining the cumulative cost of all the queries using a specific index or view in a select statement. A Table_Usage LAT (FIG. 5) is responsible for storing the cumulative cost of all write-accesses for each table.

As shown in FIG. 3, the Workload LAT consists of various columns, with the probes being collected over the query object. The Workload LAT groups queries based on their logical and physical signatures and, for each group, keeps 10 query strings. Note that the Total Execution Cost column is an aging counter, with all values older than T units of time being aged out.

The Workload LAT has a size constraint based on the amount of memory allocated to the continuous monitoring component 110. In case of the LAT storing more queries than there is available memory space, the row with the least Avg_Cost is evicted. Conceptually, this corresponds to the LRU-K algorithm, with the local heat of a query being multiplied with its average execution cost and frequency being measured using all accesses in the LAT. Also, as the time of the last access to a query may be much older than the current time, this leads to over-estimation of access frequency. To avoid this, pseudo-accesses are implemented using an ECA rule triggered periodically using a timer-based event.

Figure 4:
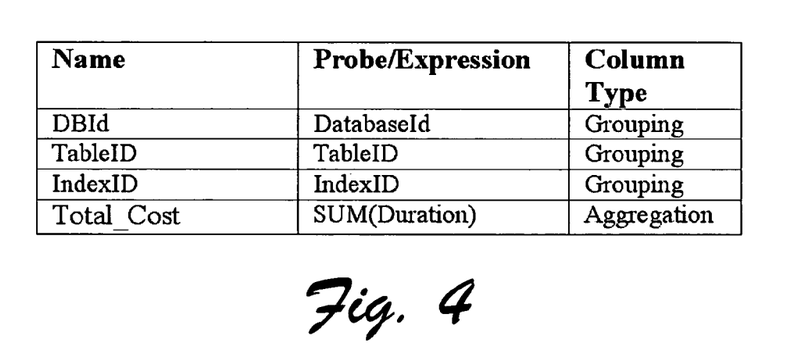
FIG. 4 illustrates an Index_Usage LAT (Lightweight Aggregation Table) for maintaining a cumulative cost of all queries using a specific index or view in a select statement.
Figure 5:
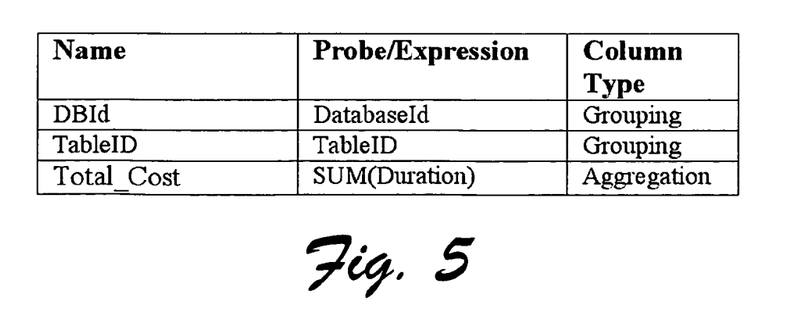
FIG. 5 illustrates a Table_Usage LAT (Lightweight Aggregation Table) for storing a cumulative cost of all write-accesses for each table.

As shown in FIGS. 4 and 5, the Index_Usage LAT and Table_Usage LAT also consist of various columns, with the probes being collected over the Index object. Note that the Total_Cost column for both usage LATs is also an aging counter, with all values older than Δ units of time being aged out.

While the above design calls for the access costs to all appropriate objects to be stored in the usage LATs, similar cost-based eviction techniques can be used for these LATs as well. In this case, as it is not possible to evaluate the coverage of objects not present in the LATs, the coverage constraints for these objects would be false by default.

Database Tuning Component

The dynamic physical design system 100 includes a remote database tuning component 104. The database tuning component 104 is typically located on a different physical machine than the database server 102 so that the overhead of the tuning does not interfere with the server's performance. Given a workload subset, WL', and additional statistics collected by the continuous monitoring component 110 as discussed above, the database tuning component 104 recommends a physical design that minimizes the cost of executing the queries in WL', under the constraint that no query that is in WL, but not in WL' may degrade in performance. That is, in determining a physical design, the database tuning component 10 minimizes the cost of executing queries in the WL' subject to the constraint that no query may degrade in performance if that query is within the query workload, WL, but not within the workload subset WL'.

To ensure that queries in WL-WL' do not degrade in performance, coverage constraints are used to specify the percentage of queries using a specific physical object (in case of selections, this refers to an index or a heap the query is reading from; in case of updates, deletes or inserts, this refers to the table who's data is modified) from WL that have to be present in WL' in order for the tuning component to be able to recommend a change to this object that may affect these queries adversely. For coverage constraints, this percentage is expressed in terms of the estimated costs of the queries rather than their number, thus giving higher importance to more expensive queries.

If size of the query text of the queries collected in WL' exceeds the given memory-bound m, it becomes necessary to evict queries from WL'. However, as (due to the resulting overhead) it is not possible to use "what-if" analysis during the monitoring to determine which queries to evict, the resulting subset WL', when tuned by database tuning component 104, may result in a degradation of the performance of WL. To illustrate this, consider the case of WL={$Q_1,Q_2$}, |WL'|=1 with both queries using an index I, but $Q_1$ performing better using index $I_1$, $Q_2$ performing better using index $I_2$, and there being only space for a one index. If cost({$Q_1$},{$I_2$})−cost({$Q_1$},{$I_1$})>cost({$Q_2$},{$I_2$})−cost({$Q_2$},{$I_1$}), and similarly cost({$Q_2$},{$I_1$})−cost({$Q_2$},{$I_2$})>cost({$Q_1$},{$I_1$})−cost({$Q_1$},{$I_2$}), then selecting either query into WL' will result in worse performance for WL.

As a "what-if" analysis can only assess the performance tradeoffs between sets of queries in WL', an assurance must be provided that database tuning component 104 does not recommend a change to the physical design unless its effect can be bound on all affected queries in WL.

For this purpose, coverage constraints are introduced into the database tuning component 104. For tables and indexes, the cost of all queries in WL is monitored, as well as the cost of each query in WL'. The tuning component is only allowed to build an index on a table T, if WL' 'covers' (i.e., 'includes') the queries from WL whose performance is affected adversely (i.e., the queries writing to T). Similarly, an index is not allowed to be dropped unless the queries using this index are part of WL. In both cases, this is assessed by comparing the total cost to one of the queries in WL'. Thus, for every subset WL' of WL substituted to database tuning component 104, cost constraints are used to ensure that the performance of WL is not made worse.

Coverage constraints can have a problematic side-effect where |WL|>>|WL'|. Here, a large number of indexes would be beneficial to the workload, but because the monitoring component is not geared towards ensuring their satisfaction, less progress can be made in tuning than if it was known up-front which queries to monitor. For example, consider the case of a workload consisting of 2 Select statements S1, S2, and 4 update statements U1-U4, with {S1, U1, U2} and {S2,U3,U4} accessing the same table respectively, and where the select statements are more expensive than the updates. If the coverage constraints for building an index on a table require >50% of the tables update cost to be present, and the workload LAT is limited to 4 queries, the Workload LAT may end up containing {S1, S2, U1, U3}, and an index cannot be built for either S1 or S2. However, if the workload LAT were biased towards updates relevant for one of the select statements, the resulting configurations {S1, S2, U1, U2} or {S1, S2, U3, U4} would result in an improved physical design. It is possible to use feedback information from the database tuning component 104 tuning loop to instruct the continuous monitoring component 110 which queries to monitor to ensure optimal use of the monitoring space.

Exemplary Methods

Figure 6:
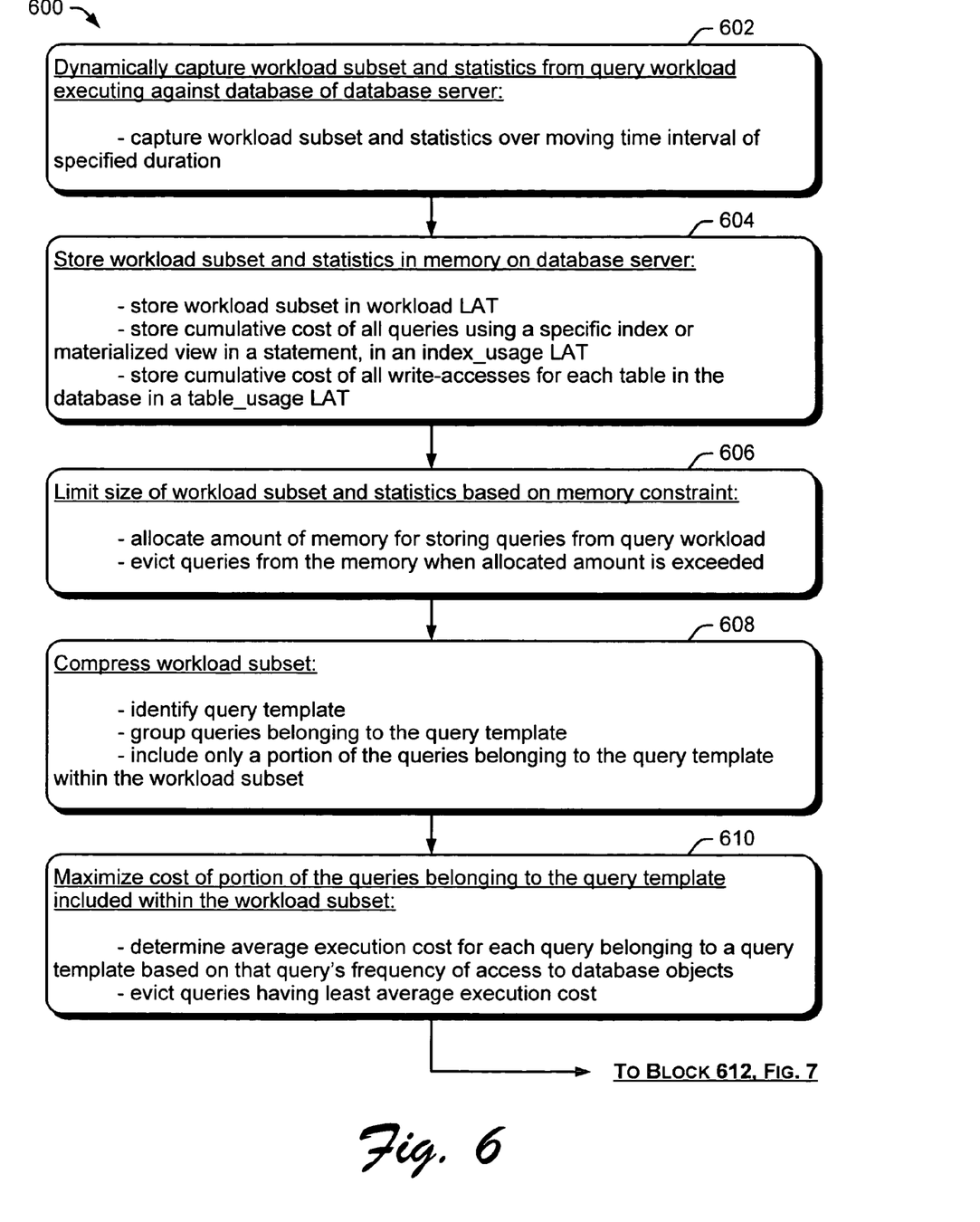
FIG. 6 is a flow diagram illustrating exemplary methods for dynamic physical database design.

Example methods for dynamic physical database design will now be described with primary reference to the flow diagrams of FIGS. 6 and 7. The methods apply to the exemplary embodiments discussed above with respect to FIGS. 1 and 2. While one or more methods are disclosed by means of flow diagrams and text associated with the blocks of the flow diagrams, it is to be understood that the elements of the described methods do not necessarily have to be performed in the order in which they are presented, and that alternative orders may result in similar advantages. Furthermore, the methods are not exclusive and can be performed alone or in combination with one another. The elements of the described methods may be performed by any appropriate means including, for example, by hardware logic blocks on an ASIC or by the execution of processor-readable instructions defined on a processor-readable medium.

A "processor-readable medium," as used herein, can be any means that can contain, store, communicate, propagate, or transport instructions for use or execution by a processor. A processor-readable medium can be, without limitation, an electronic, magnetic, optical, electromagnetic, infrared, or semiconductor system, apparatus, device, or propagation medium. More specific examples of a processor-readable medium include, among others, an electrical connection (electronic) having one or more wires, a portable computer diskette (magnetic), a random access memory (RAM) (magnetic), a read-only memory (ROM) (magnetic), an erasable programmable-read-only memory (EPROM or Flash memory), an optical fiber (optical), a rewritable compact disc (CD-RW) (optical), and a portable compact disc read-only memory (CDROM) (optical).

At block 602 of method 600, a workload subset and related statistics are captured dynamically from a workload executing against a database storage 106. "Dynamically" at least refers to the capturing or collecting of the workload subset and related statistics "online", that is, while the workload is being executed by a database server 102 against the database storage. The capturing is also performed over a moving time interval of some specified duration. The specified duration (e.g., Δ) is received from a database administrator and the time interval over which the workload subset is captured has a range from a current point in time, now, back to a preceding point in time, now-Δ. Thus, as time progresses, the window or time interval over which the workload subset is captured from the executing workload is moving, or dynamic.

At block 604, the workload subset and statistics are stored in a memory on the database server 102. More specifically, a continuous monitoring component 110 keeps state or history information about probes in LATs (Lightweight Aggregation Tables). LATs provide a mechanism for storing aggregate information over collections of monitored objects and are defined through a set of grouping attributes and a set of aggregation functions, both sets being defined over the attributes of the monitored object stored in the LAT. The workload subset is stored in a Workload LAT (FIG. 3). A cumulative cost of all the queries using a specific index or view in a select statement is stored in an Index_Usage LAT (FIG. 4). And a cumulative cost of all write-accesses for each table is stored in a Table_Usage LAT (FIG. 5).

At block 606, the size of the workload and statistics being stored is limited according to a memory constraint. Limiting the size of the workload and statistics includes allocating an amount of memory for storing queries from the query workload, and evicting queries from the memory when the allocated amount of memory is exceeded. The memory constraint is typically sent by the database administrator 108 and it provides the administrator with some control over the impact the workload collection has on the overall system.

At block 608, the workload subset is compressed. As noted above, it is possible to achieve significant compression of the workload for tuning purposes by using query signatures to group queries that follow the same query template, and keeping only a small number of query strings for each template. In scenarios where the memory constraint does not allow keeping all queries in memory on the database server 102, it is often possible to achieve significant compression of the workload by exploiting the fact that database workloads are typically made up of a limited set of query templates. Therefore, to compress the workload subset, query templates are identified as noted at block 608. Queries within the workload that belong to the same query template are grouped together. Then, only a portion of the queries that belong to each template are included in the workload subset.

At block 610, the cost of the portion of queries belonging to the query template that are included within the workload subset is maximized. That is, the cost of execution for those queries belonging to the portion of queries included in the workload subset is maximized. This includes determining the average execution cost for each query belonging to a query template based on that query's frequency of access to database objects. Then those queries having the least average execution cost are evicted, resulting in queries whose cost of execution is maximized.

It is specifically noted that the elements discussed above with respect to blocks 602-610 can be performed in an order other than the order in which the method blocks are discussed. Thus, for example, the elements of compressing the workload subset and maximizing the cost, discussed with reference to blocks 608 and 610, may occur concurrently with the elements of capturing and storing the workload subset and statistics as discussed with reference to blocks 602 and 604.

Figure 7:
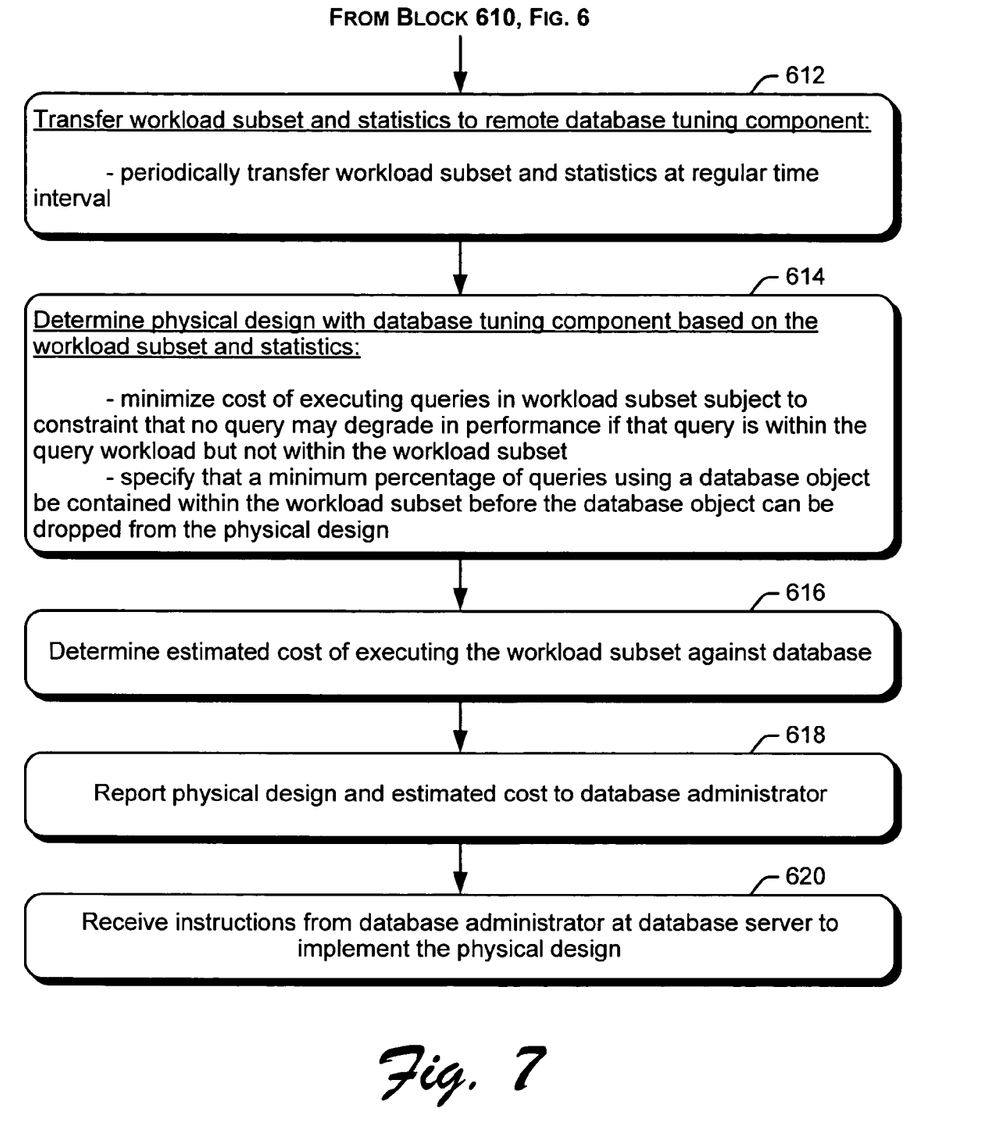
FIG. 7 is a continuation of the flow diagram of FIG. 6 illustrating exemplary methods for dynamic physical database design.

Method 600 continues on FIG. 7 at block 612. At block 612, the workload subset and statistics are transferred to a database tuning component 104 that is typically operable on a remote computing device other than the database server 102. The workload subset and statistics are also usually transferred from the database server to the tuning component at regular time intervals. Such a time interval can be determined by the database administrator 108.

At block 614, the database tuning component 104 determines a physical design based on the workload subset and statistics received from the database server 102. The physical design typically includes a set of one or more indexes and/or materialized views for the database store 106. Determining a physical design minimizing the cost of executing queries in the workload subset subject to the constraint that no query may degrade in performance if that query is within the query workload but not within the workload subset. The constraint may be specified through a minimum percentage of queries that must be present within the workload subset that are operable against a particular database object before that particular database object is allowed to be dropped from the physical design.

At block 616, the database tuning component 104 also determines an estimated cost of executing the workload subset against the database store using the physical design. At block 618, the database tuning component 104 reports the physical design and the estimated cost to the database administrator 108. A user at the database administrator 108 can determine whether or not to implement the physical design based on whether the estimated cost indicates a cost savings over a current physical design that is currently being implemented. It is noted that the tuning of the physical design and estimation of cost performed by the database tuning component 104, may occur periodically at time intervals specified by the database administrator 108.

At block 620, the database server 102 receives instructions from the database administrator 108 to implement the physical design.

Exemplary Computing Environment

FIG. 8 illustrates an exemplary computing environment suitable for implementing computer devices such as database server 102, database administrator 108, and a computing device configured to execute database tuning component 104 as discussed above with reference to FIGS. 1 and 2. Although one specific configuration is shown in FIG. 8, such computing devices may be implemented in other computing configurations.

The computing environment 800 includes a general-purpose computing system in the form of a computer 802. The components of computer 802 may include, but are not limited to, one or more processors or processing units 804, a system memory 806, and a system bus 808 that couples various system components including the processor 804 to the system memory 806.

The system bus 808 represents one or more of any of several types of bus structures, including a memory bus or memory controller, a peripheral bus, an accelerated graphics port, and a processor or local bus using any of a variety of bus architectures. An example of a system bus 808 would be a Peripheral Component Interconnects (PCI) bus, also known as a Mezzanine bus.

Computer 802 includes a variety of computer-readable media. Such media can be any available media that is accessible by computer 802 and includes both volatile and non-volatile media, removable and non-removable media. The system memory 806 includes computer readable media in the form of volatile memory, such as random access memory (RAM) 810, and/or non-volatile memory, such as read only memory (ROM) 812. A basic input/output system (BIOS) 814, containing the basic routines that help to transfer information between elements within computer 802, such as during start-up, is stored in ROM 812. RAM 810 contains data and/or program modules that are immediately accessible to and/or presently operated on by the processing unit 804.

Computer 802 may also include other removable/non-removable, volatile/non-volatile computer storage media. By way of example, FIG. 8 illustrates a hard disk drive 816 for reading from and writing to a non-removable, non-volatile magnetic media (not shown), a magnetic disk drive 818 for reading from and writing to a removable, non-volatile magnetic disk 820 (e.g., a "floppy disk"), and an optical disk drive 822 for reading from and/or writing to a removable, non-volatile optical disk 824 such as a CD-ROM, DVD-ROM, or other optical media. The hard disk drive 816, magnetic disk drive 818, and optical disk drive 822 are each connected to the system bus 808 by one or more data media interfaces 825. Alternatively, the hard disk drive 816, magnetic disk drive 818, and optical disk drive 822 may be connected to the system bus 808 by a SCSI interface (not shown).

The disk drives and their associated computer-readable media provide non-volatile storage of computer readable instructions, data structures, program modules, and other data for computer 802. Although the example illustrates a hard disk 816, a removable magnetic disk 820, and a removable optical disk 824, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 816, magnetic disk 820, optical disk 824, ROM 812, and/or RAM 810, including by way of example, an operating system 826, one or more application programs 828, other program modules 830, and program data 832. Each of such operating system 826, one or more application programs 828, other program modules 830, and program data 832 (or some combination thereof) may include an embodiment of a caching scheme for user network access information.

Computer 802 can include a variety of computer/processor readable media identified as communication media. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 802 via input devices such as a keyboard 834 and a pointing device 836 (e.g., a "mouse"). Other input devices 838 (not shown specifically) may include a microphone, joystick, game pad, satellite dish, serial port, scanner, and/or the like. These and other input devices are connected to the processing unit 804 via input/output interfaces 840 that are coupled to the system bus 808, but may be connected by other interface and bus structures, such as a parallel port, game port, or a universal serial bus (USB).

A monitor 842 or other type of display device may also be connected to the system bus 808 via an interface, such as a video adapter 844. In addition to the monitor 842, other output peripheral devices may include components such as speakers (not shown) and a printer 846 which can be connected to computer 802 via the input/output interfaces 840.

Computer 802 may operate in a networked environment using logical connections to one or more remote computers, such as a remote computing device 848. By way of example, the remote computing device 848 can be a personal computer, portable computer, a server, a router, a network computer, a peer device or other common network node, and the like. The remote computing device 848 is illustrated as a portable computer that may include many or all of the elements and features described herein relative to computer system 802.

Logical connections between computer 802 and the remote computer 848 are depicted as a local area network (LAN) 850 and a general wide area network (WAN) 852. Such networking environments are commonplace in offices, enterprise-wide computer networks, intranets, and the Internet. When implemented in a LAN networking environment, the computer 802 is connected to a local network 850 via a network interface or adapter 854. When implemented in a WAN networking environment, the computer 802 includes a modem 856 or other means for establishing communications over the wide network 852. The modem 856, which can be internal or external to computer 802, can be connected to the system bus 808 via the input/output interfaces 840 or other appropriate mechanisms. It is to be appreciated that the illustrated network connections are exemplary and that other means of establishing communication link(s) between the computers 802 and 848 can be employed.

In a networked environment, such as that illustrated with computing environment 800, program modules depicted relative to the computer 802, or portions thereof, may be stored in a remote memory storage device. By way of example, remote application programs 858 reside on a memory device of remote computer 848. For purposes of illustration, application programs and other executable program components, such as the operating system, are illustrated herein as discrete blocks, although it is recognized that such programs and components reside at various times in different storage components of the computer system 802, and are executed by the data processor(s) of the computer.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:
1. A computer implemented method comprising:
dynamically capturing a workload subset and related statistics from a query workload executing against a database of a database server;
compressing the workload subset on the database server, and storing the workload subset and the statistics in a memory on the database server,
wherein the compressing comprises identifying a query template, grouping queries belonging to the query template, and including within the workload subset only a portion of those queries having a greatest cost that belong to the query template;

maximizing a cost of the portion of the queries included within the workload subset, wherein the maximizing comprises determining an average execution cost for each query belonging to a query template based on that query's frequency of access to database objects, and evicting a query having a least average execution cost from the workload subset;

limiting the size of the workload subset and the statistics based on a memory constraint, wherein the limiting comprises allocating an amount of memory for storing queries from the query workload, and evicting queries having the least cost from the memory when the allocated amount of memory is exceeded;

transferring the workload subset and the statistics to a database tuning component remote from the database server, wherein the database tuning component comprises a feedback tuning loop and a monitoring component;

determining a physical design with the database tuning component, wherein the physical design is applicable to the query workload executing against the database and is determined based on the workload subset and the statistics, wherein the determining a physical design comprises minimizing a cost of executing queries in the workload subset subject to a constraint that no query shall degrade in performance if that query is within the query workload but not within the workload subset;

determining an estimated cost of executing the workload subset against the database using the physical design; and reporting the physical design and the estimated cost to a database administrator.

2. The method of claim 1, wherein the dynamically capturing comprises capturing the workload subset and the statistics over a moving time interval, the moving time interval having a specified duration which ranges from a current point in time to a preceding point in time.

3. The method of claim 2, further comprising receiving at the database server, an instruction from a database administrator indicating the specified duration.

4. The method of claim 1, wherein the storing the workload subset and the statistics comprises:

storing the workload subset in a workload LAT (lightweight aggregation table);

storing in an index_usage LAT, a cumulative cost of all queries using a specific index or materialized view in a select statement; and storing in a table_usage LAT, a cumulative cost of all write-accesses for each table in the database.

5. The method as recited in claim 1, wherein the transferring comprises periodically transferring the workload subset and the statistics to the index tuning component at a regular time interval.

6. The method of claim 1, wherein the determining a physical design comprises specifying that a minimum percentage of queries using a database object be contained within the workload subset before the database object can be dropped from the physical design.

7. The method of claim 1, wherein the physical design comprises a set of one or more indexes and/or materialized views.

8. The method of claim 1, further comprising receiving instructions from the database administrator at the database server to implement the physical design, wherein the instructions from the database administrator are based on the physical design and the estimated cost reported to the database administrator.

9. A processor-readable storage medium comprising processor-executable instructions configured for:

monitoring a query workload (WL), executing on a database server over a sliding time interval;

capturing a workload subset (WL'), of WL;

capturing statistics associated with WL;

compressing WL' on the database server, wherein the compressing comprises identifying a query template, grouping queries belonging to the query template, and including within WL' only a portion of those queries having a greatest cost that belong to the query template;

maximizing a cost of the portion of the queries included within WL', wherein the maximizing comprises determining an average execution cost for each query belonging to a query template based on that query's frequency of access to database objects, and evicting a query having a least average execution cost from WL';

storing WL' and the statistics in a main memory of the database server such that WL' and the statistics are limited in size according to a memory constraint m, comprising allocating an amount of memory for storing WL' and the statistics, determining queries within WL' having the lowest average execution cost, receiving a query for WL' whose text size causes WL' to exceed the memory constraint m, and evicting queries having the lowest average execution cost from within WL' when the allocated amount of memory is exceeded, thereby keeping WL' within the memory constraint m;

copying WL' and the statistics at regular intervals to a remote database tuning component, the remote database tuning component analyzing the WL' and the statistics to report a new physical design for a corresponding database of the database server, the new physical design for executing the WL';

wherein reporting the new physical design comprises minimizing a cost of executing queries in WL' subject to a constraint that no query shall degrade in performance if that query is within WL but not within WL';

determining an estimated cost of executing WL' against a database using the new physical design; and reporting the new physical design and the estimated cost to a database administrator.

10. The processor-readable storage medium of claim 9, comprising further processor-executable instructions configured for:

receiving a time duration ($\Delta$); and wherein the monitoring comprises monitoring WL for the time duration of $\Delta$ over the time interval of [now-$\Delta$, now], wherein now is a current point in time.

11. A computer comprising the processor-readable medium of claim 9.

12. A processor-readable storage medium comprising processor-executable instructions configured for a database tuning component to:

receive a workload subset (WL'), and associated statistics from a database server remote from the database tuning component;

compress the workload subset on the database server, and store the workload subset and the statistics in a memory on the database server, wherein compressing the workload comprises identifying a query template, grouping queries belonging to the query template, and including within the workload subset only a portion of those queries having a greatest cost that belong to the query template;

maximizing a cost of the portion of the queries included within the workload subset, wherein maximizing a cost comprises determining an average execution cost for each query belonging to a query template based on that query's frequency of access to database objects, and evicting a query having a least average execution cost from the workload subset;

receive a coverage constraint regarding a physical database object, the coverage constraint specifying a percentage of queries in a workload WL using the physical database object that must be present in WL' before the physical database object can be changed;

determine a physical design based on WL' and the associated statistics, wherein determining a physical design comprises minimizing a cost of executing queries in WL subject to a constraint that no query shall degrade in performance if that query is within WL but not within WL';

determine an estimated cost of executing WL' against a database using the physical design;

report the physical design and the estimated cost to a database administrator;

preclude a change to the physical database object in the physical design if the percentage of queries is not present within WL'; and permit a change to the physical database object in the physical design if the percentage of queries is present within WL'.

13. The processor-readable medium of claim 12, comprising further processor-executable instructions configured for determining an estimated cost of executing WL' against a database.

14. The processor-readable medium of claim 13, comprising further processor-executable instructions configured for reporting the physical design and the estimated cost to a database administrator.

15. The processor-readable medium of claim 12, wherein receipt of the workload subset, WL', and associated statistics comprises periodically receiving a workload subset, WL', and associated statistics according to a tuning interval specified by a database administrator.

16. A computer comprising the processor-readable medium of claim 12.

17. A dynamic physical database design system comprising:

a database server;

a database storage device;

a continuous monitoring component configured to monitor a query workload executing on the database server against the database store, and to capture and compress a subset of the query workload and associated statistics over a specified time interval, wherein the continuous monitoring component is further configured to identify a query template, group queries belonging to the query template, and include within the workload subset only a portion of those queries having a greatest cost that belong to the query template, wherein the continuous monitoring component is further configured to maximize a cost of the portion of the queries included within the workload subset, comprising determining an average execution cost for each query belonging to a query template based on that query's frequency of access to database objects, and evicting a query having a least average execution cost from the workload subset; and a database tuning component remote from the database store configured to receive the subset and statistics from the continuous monitoring component and to determine a physical design that minimizes a cost of executing queries in the subset subject to a constraint that no query shall degrade in performance if that query is within the query workload but not within the subset, wherein the database tuning component is further configured to determine a physical design, wherein the physical design is applicable to the query workload executing against the database store and is determined based on the workload subset and the statistics, determine an estimated cost of executing the workload subset against the database store using the physical design, and report the physical design and the estimated cost to a database administrator.

18. The dynamic physical database design system of claim 17, the database administrator further configured to receive the physical design and the cost estimate and to instruct the database server to implement the physical design based on the cost estimate.

* * * * *